Patented June 9, 1942

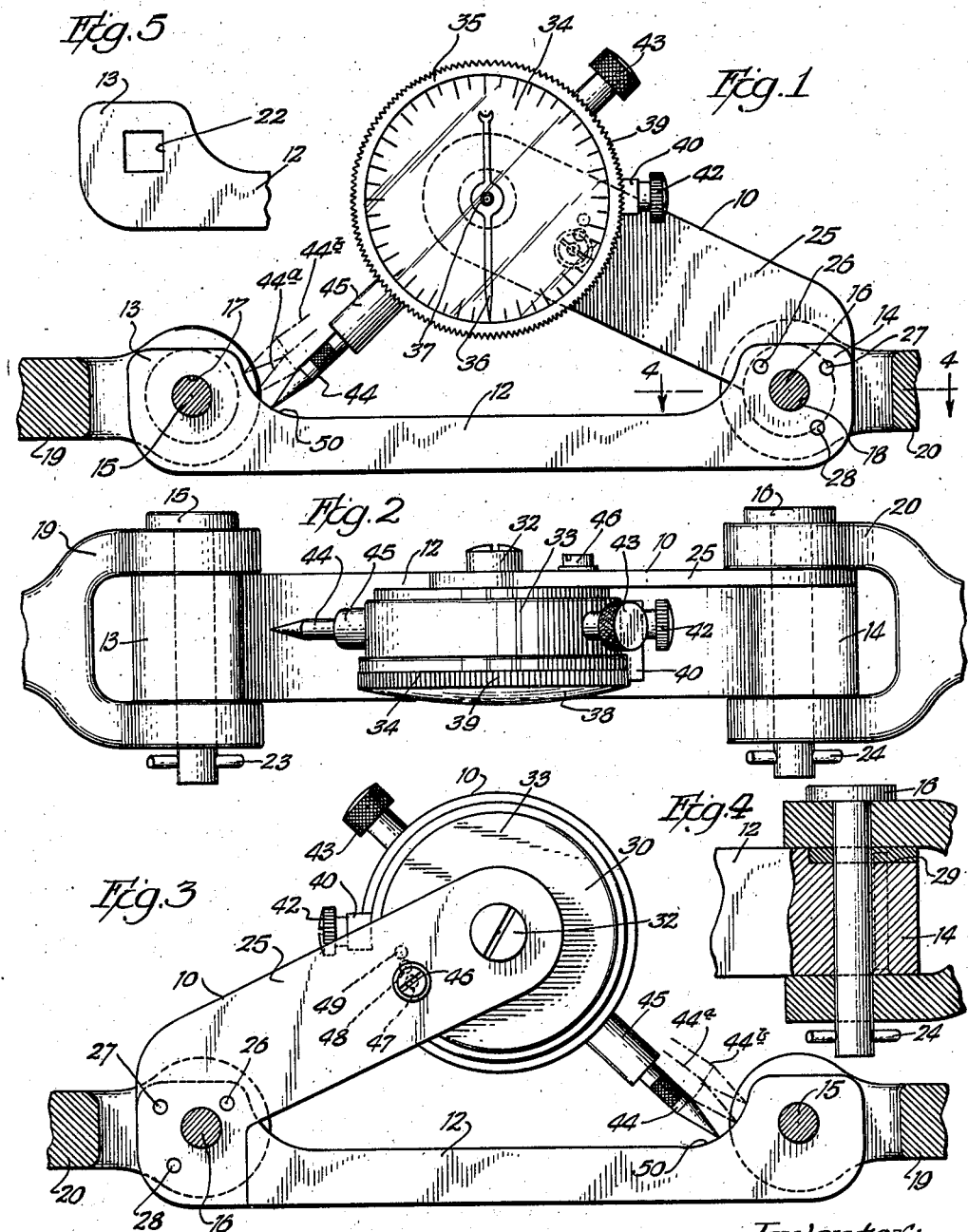

2,285,500

UNITED STATES PATENT OFFICE 2,285,500

DYNAMOMETER

William C. Dillon, Chicago, Ill., assignor to W. C. Dillon & Company, Inc., Chicago, Ill., a corporation of Illinois Application December 21, 1939, Serial No. 310,283

8 Claims. (Cl. 265—68)

My invention relates to dynamometers of the type utilized in the measurement of exerted forces.

An object of my invention is to provide a compact, portable, direct reading dynamometer which is adapted to be utilized for measuring exerted forces.

Another object of my invention is to provide a small, accurate instrument for measuring compression or tensile forces which may be manufactured at reasonable cost.

Another object of my invention is to provide a dynamometer for measuring exerted forces, the measuring range of which may be quickly and easily changed without replacing any of the parts thereof.

Another object of my invention is to provide a dynamometer for measuring exerted force which is not damaged or rendered inaccurate by overloading, even to a considerable degree.

Another object of my invention is to provide a dynamometer for measuring exerted force, the dial for which is easily movable for setting or resetting the zero position of the dial.

Another object of my invention is to provide a dynamometer for measuring exerted force which incorporates a standard indicating instrument as the means for indicating the measured force.

Another object of my invention is to provide a dynamometer for measuring relatively large exerted forces which has a direct reading dial scale and a cooperating pointer and a mechanism providing smooth and substantially instantaneous operation of the pointer in response to exerted forces.

Other objects of the invention relate to features of construction and arrangement of parts which will be apparent from a consideration of the following specification and accompanying drawing, wherein:

Figures 1, 2 and 3 are, respectively, front, top and rear elevations of a preferred embodiment of my invention;

Figure 4 is a fragmentary sectional view of a detail of my invention with the section taken substantially on a line 4—4 of Figure 1 and in the direction of the arrows;

Figure 5 is a fragmentary view showing a modification of my present invention.

Having particular reference to the drawing, the dynamometer 10 includes a flexible bar 12 of steel or other suitable material, the physical dimensions and material of which are chosen to suit the requirements of flexibility and the exerted forces which are to be measured with the instrument. The flexible bar 12 has enlarged angularly projecting end portions 13 and 14 which preferably project from the same side of the bar 12. Pins 15 and 16 extend through openings 17 and 18, respectively, in the projecting portions 13 and 14, and provide supports for rotatably securing yokes 19 and 20 to the ends of the bar. The yokes 19 and 20 are adapted to have suitable elements secured thereto for applying the forces to be measured to the dynamometer. The cross section of the mid-portion of the bar 12 is reduced and the openings 17 and 18 are displaced to one side of the longitudinal axis of the reduced portion of the section so that either tensile or compression forces applied to the bar through the yokes 19 and 20 effect flexure of the mid-portion of the bar. The projected portions 13 and 14 are preferably sufficiently thick or heavy that the flexure of those portions of the bar is not appreciable with respect to the flexure of the mid-portion of the bar. Where tensile forces are to be measured, the openings 17 and 18 are preferably round and the pins 15 and 16 are preferably round, so that the yokes 19 and 20 are rotatable with respect to the bar 12. With these parts relatively rotatable, the bar aligns itself with the applied linear force and is not distorted due to an angularly applied force. However, in some instances where compressive forces are to be measured, it is preferable that the pins and openings are rectangular, as indicated at 22 in Figure 5, so as to prevent rotation of the bar upon the application of compressive force. In either instance, the pins 15 and 16 are held in place by cotter pins 23 and 24, or other suitable means. A supporting arm 25 is non-rotatably secured to one end of the bar 12 by spaced rivets or pins 26, 27 and 28, which extend through the bar 12 and the support arm 25. The support arm 25 is also preferably set into a notch or recess 29 in the bar 12 to make the support therefor more secure and so that the outer surface of the support arm is flush with the surface of the bar. The support arm is angularly disposed with respect to the longitudinal axis of the bar and preferably extends somewhat toward the other end of the bar from that to which it is secured.

An indicating device 30 is secured to the extending portion of the support arm 25, preferably near the extending end thereof, by a screw 32 which extends through the support arm and is threaded into the back of the indicating device. This indicating device 30 may be any one of a number of standard indicating devices which are on the market, and has been indicated as a standard type of plunger actuated dial indicator of which there are a number of standard devices manufactured by well known companies and known as "dial indicators." The indicating device 30 has a case 33, calibrated dial 34 and a rim or bezel 35 which is rotatably mounted on the case 33 and has the dial 34 secured thereto. A hand or pointer 36 is rotatably mounted on a shaft 37 in cooperative relation with respect to the dial 34 and concentric with regard thereto. A transparent glass cover 38 is secured to the rim or bezel 35 to cover the dial 34 and pointer 36. The outer edge of the rim or bezel 35 is preferably knurled or grooved as at 39 to facilitate manual movement of the rim or bezel with respect to the case 33. After adjustment of the position of the dial 34 with respect to the pointer 36 by movement of the rim or bezel 35, it is secured in position by a clamp 40, which is tightened against the surface of the rim or bezel by thumb screw 42 which extends through the clamp 40 and is threaded into the case 33. The indicating device preferably has a handle 43 secured to the case 33 and projecting therefrom.

The indicating device includes a standard multiplying mechanism, which is not shown, but which effects rotary movement of the pointer 36 in response to linear movement of a plunger 44 which is slidably mounted in a sleeve 45 which is secured to the case 33. The plunger 44 is biased outwardly away from the case 33 so that outward movement responsive to the bias force keeps the plunger in contact with the bar during flexure of the bar to actuate the pointer in one direction, and inward movement of the plunger toward the case 33 during flexure of the bar rotates the pointer in the other direction.

In the preferred embodiment of my invention, the indicating device 30 is so disposed with respect to the bar 12 that the plunger 44 engages the surface of the bar near the end of that bar opposite the end to which the support arm 25 is secured. With the plunger 44 biased against the surface of the bar 12, the pointer 36 is in its normal zero position when the bar 12 is unflexed and there is no force applied thereto through the yokes 19 and 20. Also, in the preferred embodiment of my invention, the position of the indicating device 30 is preferably adjustable so that the point at which the plunger 44 engages the surface of the bar 12 may be varied to vary the range of forces which may be measured by the dynamometer without changing any of the parts thereof. In the illustrated means of accomplishing this adjustment, a screw 46 extends through one of a plurality of openings 47, 48 or 49 in the support arm 25 and is threaded into the case 33. By changing the opening through which the screw 46 extends, the angular position of the indicating device with respect to the support arm 25 is varied. This variation of the angular position of the indicating device varies the point of engagement of the plunger 44 with the bar 12, as indicated in dot and dash lines at 44a and 44b. The surface of the bar which is engaged by the plunger 44 is preferably curved as at 50. This curved surface not only acts as a fillet to strengthen the bar, but is preferably concentric with respect to the axis of rotation of the indicating device about the axis of the screw 32, so that the position of the plunger 44 with respect to the indicating device remains substantially the same in any of the positions to which the indicating device is adjusted. Different calibrations on the dial, which may be put on in different colors or in different rows, or a multiplying factor for the standard single dial, may be utilized to indicate the range of forces measurable at the different positions to which the indicating device is adjusted.

In the operation of the dynamometer, a force, such as a tensile force, is applied to the dynamometer through the yokes 19 and 20 by any suitable means secured thereto. The application of the force to the bar 12 through the yokes 19 and 20 effects a flexure of that bar, since the axis of application of the force is displaced with respect to the longitudinal axis of the mid-portion of the bar. This flexure of the bar effects relative movement between the ends thereof so that the support arm 25 moves angularly with respect to the bar, and the indicating device moves relatively with respect to the surface of the bar which is engaged by the plunger 44. The plunger 44, being biased into engagement with the surface of the bar, follows the relative movement effected by the flexure and produces a corresponding movement of the pointer 36 with respect to the dial 34. Since the flexure of the bar is directly dependent upon the force applied thereto, the corresponding movement of the pointer 36 is also dependent upon that applied force.

When compression forces are applied to the bar instead of tensile forces, the action of the device is similar and a flexure of the bar is effected which is dependent upon the force applied, but the movement of the plunger 44 and the pointer 36 is in the opposite direction from that produced by tensile forces.

Although the characteristics of the bar 12, which are controlled by the material and dimensions thereof, control the general range of forces which may be measured by the dynamometer, the range may be varied by a considerable degree by varying the position of the indicating device so as to vary the position at which the plunger 44 engages the bar 12. This change of the point at which the plunger 44 engages the bar 12 changes the effective relative movement between the parts for a given applied force and thereby changes the deflection of the pointer 36 which corresponds to a given force. The range of forces measurable on the dial is to be varied without changing any of the essential parts of a given dynamometer. In any position of the indicating device 30, the zero position of the dial 34, which corresponds to the position of rest of the pointer 36, may be set or reset by adjustment of the rim or bezel 35 after loosening the thumb screw 42.

While I have shown and described a specific embodiment of my invention for the purpose of illustration, it will be apparent that changes may be made therein without departing from the spirit of the invention.

What I claim as new and desire to cover by Letters Patent is:

1. A dynamometer comprising, in combination, a normally straight flexible bar having integral angularly disposed portions and means for applying force to the angularly disposed portions in a direction transverse to the angularly disposed portions for effecting flexure of the bar in a direction transverse to the normally straight bar, said flexure being dependent upon the force applied, a rigid arm rigidly secured to one end of the flexible bar, and a plunger actuated dial indicator secured to said arm at a position spaced from the bar and so disposed that said plunger rests against the bar at a place which is spaced from the arm and between the angularly disposed portions, said plunger being responsive to the flexure of the bar to actuate the indicator.

2. A dynamometer comprising, in combination, a bar having a straight flexible portion and substantially rigid angularly disposed means at the ends thereof, means for applying force to the angularly disposed means in a direction parallel to the straight flexible portion to thereby effect flexure of the bar which is dependent upon the force applied, an arm secured to one end of the flexible bar, and a plunger actuated dial indicator secured to the arm at a position spaced from the bar and so disposed that said plunger contacts the bar at a position intermediate the ends thereof and spaced from the arm, said plunger being responsive to the flexure of the bar to actuate the indicator.

3. A dynamometer comprising, in combination, a straight flexible bar having substantially rigid angularly disposed means at the ends thereof, means comprising oppositely disposed rotatably supported links for applying force to the angularly disposed means to thereby effect flexure of the bar which is dependent upon the force applied, and an arm secured to one end of the flexible bar and angularly disposed with respect thereto, a plunger actuated dial indicator secured to the arm at a position spaced from the bar and so disposed that said plunger contacts the bar at a position spaced from the arm, said plunger being responsive to the flexure of the bar to actuate the indicator, the position of said dial indicator being adjustable for changing the range of forces which may be indicated by the indicator.

4. A dynamometer comprising, in combination, a straight flexible bar having substantially rigid angularly disposed means at the ends thereof, means comprising oppositely disposed rotatably supported elements for applying force to the angularly disposed means to thereby effect flexure of the bar which is dependent upon the force applied, an arm secured to one end of the flexible bar and disposed to form an acute angle therewith, a plunger actuated dial indicator secured to the arm at a position spaced from the bar and so disposed that said plunger contacts the bar at a position spaced from the arm, said plunger being responsive to the flexure of the bar to actuate the indicator, and means for adjusting the indicator position to change the position at which the plunger contacts the bar and to thereby change the range of forces which may be indicated by the indicator.

5. A dynamometer comprising, in combination, a straight flexible member, means including elements angularly disposed with respect to the flexible member through which force is applied to said flexible member in a direction parallel thereto for flexing said member by an amount dependent upon the applied force, dial indicating means having an actuating element projecting therefrom, and a support arm secured to said member, said indicating means being secured to said support arm in such a position that it is spaced from said member and the actuating element engages the member at a distance from the support arm so that flexure of the member effects relative movement between the indicating means and actuating element to provide an indication of the force effecting said flexure.

6. A dynamometer comprising, in combination, a flexible member having a straight flexible portion, means applying a force in the direction of the longitudinal axis of said straight flexible portion and displaced from said axis for flexing said member by an amount dependent upon the force applied thereto, dial indicating means having an actuating element projecting therefrom, a support arm secured to said member, said indicating means being secured to said support arm in such a position that it is spaced from said member and the actuating element engages the member at a distance from the support arm so that flexure of the member effects relative movement between the indicating means and actuating element to provide an indication of the force effecting said flexure, and means for adjusting the position of the indicating means to vary the range of forces measurable on the indicating means.

7. A dynamometer comprising, in combination, a flexible member having a longitudinal axis, means comprising angularly projecting portions on the flexible member to which force is applied in the direction of the axis for flexing said member by an amount dependent upon the force applied thereto, dial indicating means having an actuating element projecting therefrom, a support arm secured to said member, said indicating means being secured to said support arm in such a position that it is spaced from said member and the actuating element engages the member at a distance from the support arm so that flexure of the member effects relative movement between the indicating means and actuating element to provide an indication of the force effecting said flexure, and means for adjusting the position at which the actuating element engages the member.

8. A dynamometer comprising, in combination, a linear flexible member having a longitudinal axis, means comprising portions projecting angularly from the flexible member to which force is applied in a direction parallel to said axis for flexing said member by an amount dependent upon the force applied thereto, dial indicating means having a calibrated dial and cooperating pointer and having a support arm secured to said member, said indicating means being secured to said support arm in such a position that it is spaced from said member and the actuating element engages the member at a distance from the support arm so that flexure of the member effects relative movement between the indicating means and actuating element to provide an indication of the force effecting said flexure, means for varying the range of force measurable on the indicating means, and means for adjusting the relative normal positions of the said dial and pointer.

WILLIAM C. DILLON.